United States Patent [19]
Kim et al.

[11] Patent Number: 5,946,067
[45] Date of Patent: Aug. 31, 1999

[54] LIQUID CRYSTAL DISPLAY

[75] Inventors: Hyang Yul Kim; Seung Hee Lee, both of Ich'on; Bong Gyu Rho, Suwon; In Cheol Park, Seoul, all of Rep. of Korea

[73] Assignee: Hyundai Electronics Industries Co., Ltd., Kyoungki-do, Rep. of Korea

[21] Appl. No.: 09/209,730

[22] Filed: Dec. 11, 1998

[30] Foreign Application Priority Data

Dec. 29, 1997 [KR] Rep. of Korea ........................ 97-76737

[51] Int. Cl.⁶ .................... G02F 1/1335; G02F 1/1343
[52] U.S. Cl. ...................... 349/141; 349/106; 349/139; 349/143; 349/144
[58] Field of Search ........................ 349/141, 143, 349/144, 139, 106

[56] References Cited

U.S. PATENT DOCUMENTS

| | | | |
|---|---|---|---|
| 5,438,442 | 8/1995 | Katakura | 349/144 |
| 5,606,437 | 2/1997 | Moiser | 349/106 |
| 5,657,105 | 8/1997 | McCartney | 349/157 |
| 5,680,190 | 10/1997 | Michibayashi et al. | 349/140 |
| 5,721,599 | 2/1998 | Cheng | 349/106 |
| 5,734,451 | 3/1998 | Yanagawa | 349/43 |
| 5,760,857 | 6/1998 | Yanagawa et al. | 349/43 |
| 5,781,262 | 7/1998 | Suzuki et al. | 349/128 |

FOREIGN PATENT DOCUMENTS 09054341 2/1997 Japan ........................ G02F 1/136

*Primary Examiner*—William L. Sikes
*Assistant Examiner*—Dung Nguyen
*Attorney, Agent, or Firm*—Ladas & Parry

[57] ABSTRACT

The pixel electrode and the counter electrode are devised so that an electric field generated between the counter electrode and the pixel electrode in one unit pixel region is parallel to the gate bus line and an electric field in another unit pixel regions adjacent to the one unit pixel region in left, right, upper and lower directions is vertical to the gate bus line. Therefore, the color shift of the liquid crystal display can be prevented.

20 Claims, 6 Drawing Sheets

FIG.1
(Conventional)
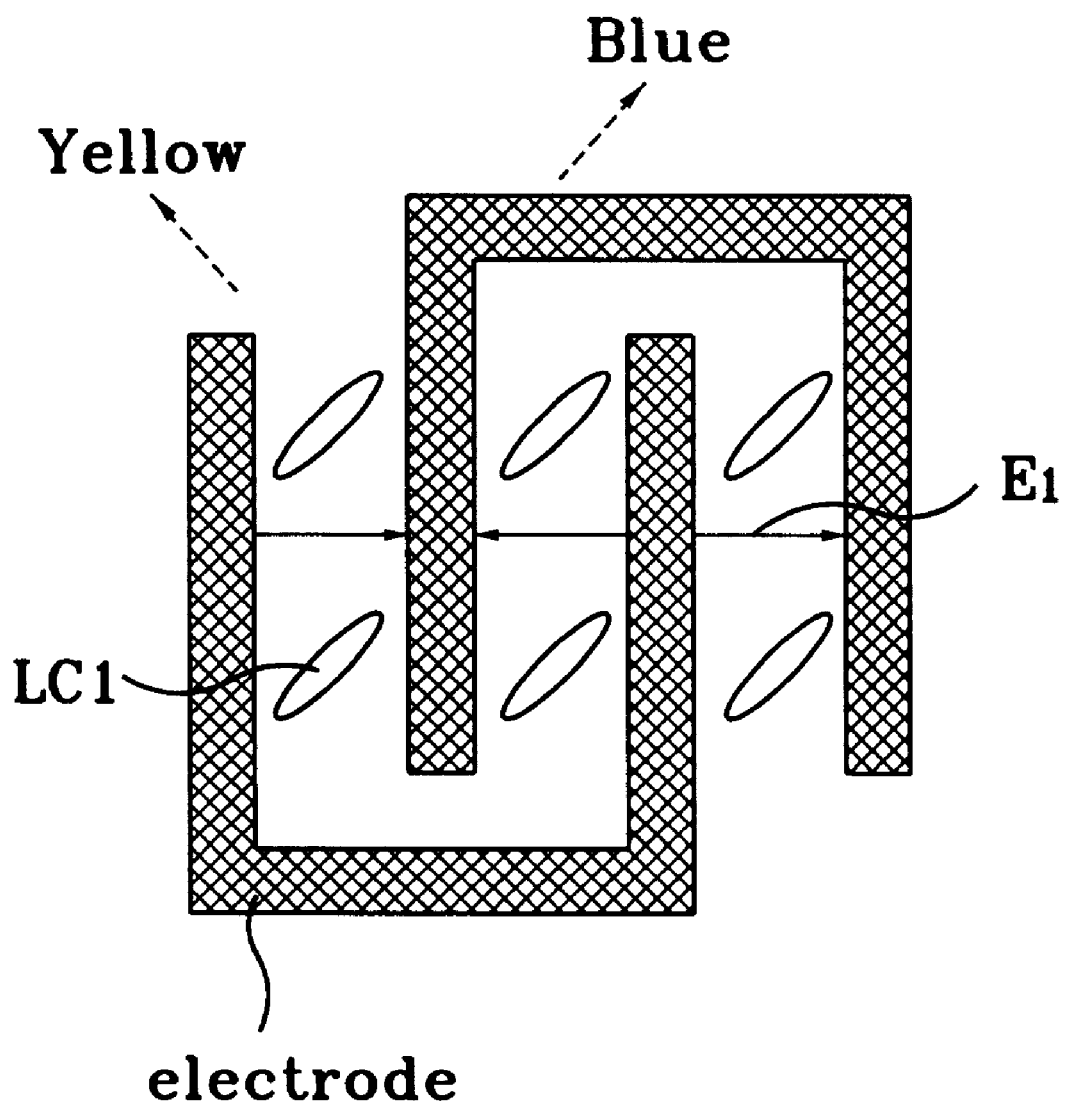

LIQUID CRYSTAL DISPLAY

BACKGROUND

The present invention relates to a technique of a liquid crystal display(LCD) in which an electric field is parallel to surfaces of a pair of substrates between which the liquid crystal is interposed and more particularly to a structure of electrodes of the wide viewing angle LCD, which is capable of solving a color shift dependent on a viewing angle in such LCD.

Conventionally, the LCD employing Nematic liquid crystal is widely used as a segment type display such as a watch or a calculator. A transparent substrate composing the LCD, has a switching device as an active element for selectively driving a pixel electrode applying a voltage to the liquid crystal. The color filters of red, blue and green are provided as the color display device. The LCD is classified into an active drive type twisted Nematic(TN) mode in which the Nematic liquid crystal molecule has 90° twisted angle and a multiple drive super twisted Nematic(STN) mode using a rapid relation between a transmittance and a voltage applied to the liquid crystal by twisting the Nematic liquid crystal molecule over 90°. Among two modes, TN mode LCD was conventionally and widely used.

However, in such TN mode LCD, since the liquid crystal molecule has an index of refraction anisotropy and is slantly arranged with respect to the substrate, a contrast of the displayed image is highly dependent on the viewing angle. One of the research for solving the narrow viewing angle is an In-Plane Switching(IPS) mode LCD.

The cell of the IPS mode LCD includes a lower substrate and a upper substrate between which a liquid crystal molecules are interposed, a pixel electrode and a counter electrode formed on the lower substrate and vertical alignment films formed on the lower substrate and the upper substrate. The liquid crystal molecule is driven along the electric field generated between the electrodes on the lower substrate. When no voltage is applied to the IPS mode LCD, the liquid crystal molecules are vertically arranged to the substrate between two substrates by the vertical alignment, so the polarization films whose polarization axis are across to each other and attached on the rear surfaces of the lower substrate and the upper substrate, block the light incident to the substrate(normally black mode). In applying the voltage, the liquid crystal molecules rotate toward the electric field so as to form about 45° with the polarization axis of the polarization film, so the light leakage of the LCD happens. As shown in FIG. 1, the conventional IPS mode LCD has a problem of a color shift dependent on the viewing angle. In other words, since, when the voltage is applied, the liquid crystal molecules are arranged in a specific single direction, the screen of the LCD at the minor axis of the liquid crystal molecule takes a blue and the screen of the LCD at the major axis of the liquid crystal molecule takes a yellow. Accordingly, the quality of the LCD panel is degraded.

SUMMARY

Accordingly, an aim of a present invention is to compensate for an index of refraction anisotropy of the liquid crystal molecule, thereby preventing a color shift of a wide viewing angle LCD.

In order to accomplish the aim of the present invention, considering that human's eye is not sensitive to a light controlled by unit pixel, the electrode structure in R, G and B unit pixels of one pixel is differently designed. When the voltage is applied, the liquid crystal molecules in one unit pixel rotate toward the right direction and are horizontally arranged, while the liquid crystal molecules in another unit pixels adjacent to the one unit pixel in left, right, upper and lower directions rotate toward the left direction and are vertically arranged. Accordingly, the number of the liquid crystal molecules arranged in the horizontal direction and the number of the liquid crystal molecules arranged in the vertical direction are same, so the index of refraction anisotropy is compensated.

In detail, a liquid crystal display(LCD) having a plurality of gate bus lines and a plurality of data bus lines disposed in a matrix form on a lower substrate, for defining a plurality of unit pixel regions, comprises: a plurality of pixel electrode, as a first electrode, each formed on each unit pixel region; and a plurality of counter electrodes, as the second electrode, corresponding to the first electrodes, each of the second electrodes formed on each unit pixel region. Wherein a direction of an electric field generated between the first electrode and the second electrode in one unit pixel region among the plurality of unit pixel regions is substantially traverse to a direction of an electric field generated between the first electrode and the second electrode in another unit pixel region adjacent to the one unit pixel region. The unit pixel region comprises a first sub unit pixel region, a second sub unit pixel region and a third sub unit pixel region, and the first sub unit pixel region, the second sub unit pixel region and the third sub unit pixel region are a red color region, a green color region and a blue color region, respectively. Also, a direction of an electric field generated between the first electrode and the second electrode in one sub unit pixel region among the three sub unit pixel regions is substantially traverse to a direction of an electric field generated between the first electrode and the second electrode in another sub unit pixel region adjacent to the one sub unit pixel region.

BRIEF DESCRIPTION OF THE ATTACHED DRAWINGS

FIG. 1 is a scheme illustrating an arrangement of the liquid crystal of the conventional IPS mode LCD in accordance with an electric field.

DESCRIPTION OF THE EMBODIMENT

Embodiment 1

Figure 2:
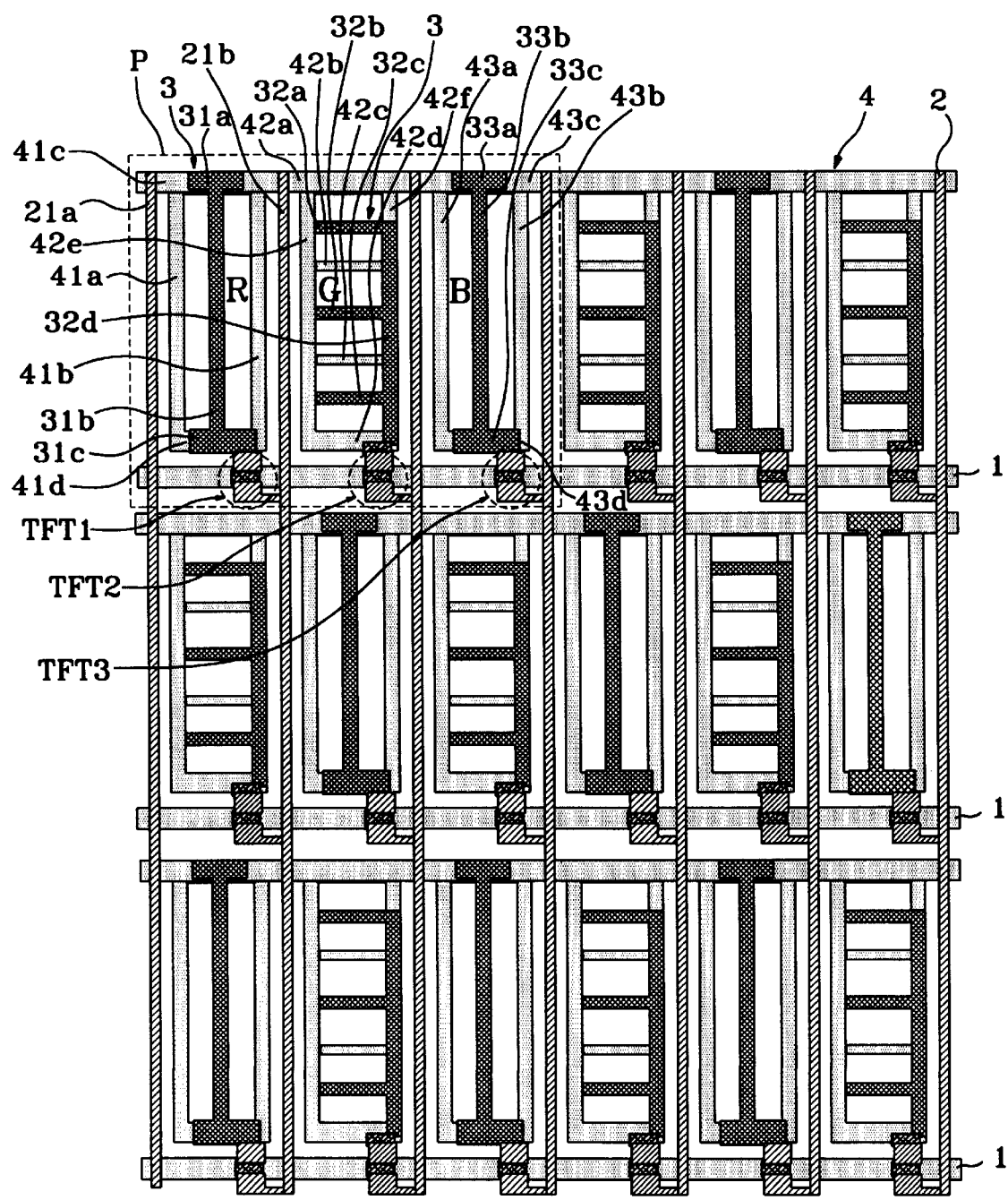
FIG. 2 is a scheme illustrating a structure of electrodes of the first embodiment in accordance with the present IPS mode LCD.

FIG. 2 shows a pixel layout of the LCD according to the first embodiment of the present invention.

As shown in the dotted line, the unit pixel P comprises three sub unit pixels R, G and B. A region for each sub unit pixel is defined by a gate bus line 2 and a data bus line 1 crossing to the gate bus line 2, the gate bus line and the data bus line being formed on the transparent lower substrate. From now except the "WHAT IS CLAIMED IS" part, each sub unit region is called as "unit pixel region". Each unit pixel region has a storage capacitor, a thin film transistor of the switching device, a pixel electrode 3, a counter electrode 4 and a color filter(not shown). In detail, the pixel electrode 3 and the counter electrode 4 are formed on the lower substrate and the alignment film (not shown) is formed on the resultant surface. On a upper substrate opposite to the lower substrate is provided the color filter and a black matrix (not shown) for blocking the light. Also, on the surface of the upper substrate opposite to the lower substrate is formed an alignment film. On non-opposite surfaces of the lower substrate and the upper substrate are attached polarization films, repsectively. Between the alignment film of the upper substrate and the alignment film of the lower substrate is interposed a liquid crystal.

Figure 4:
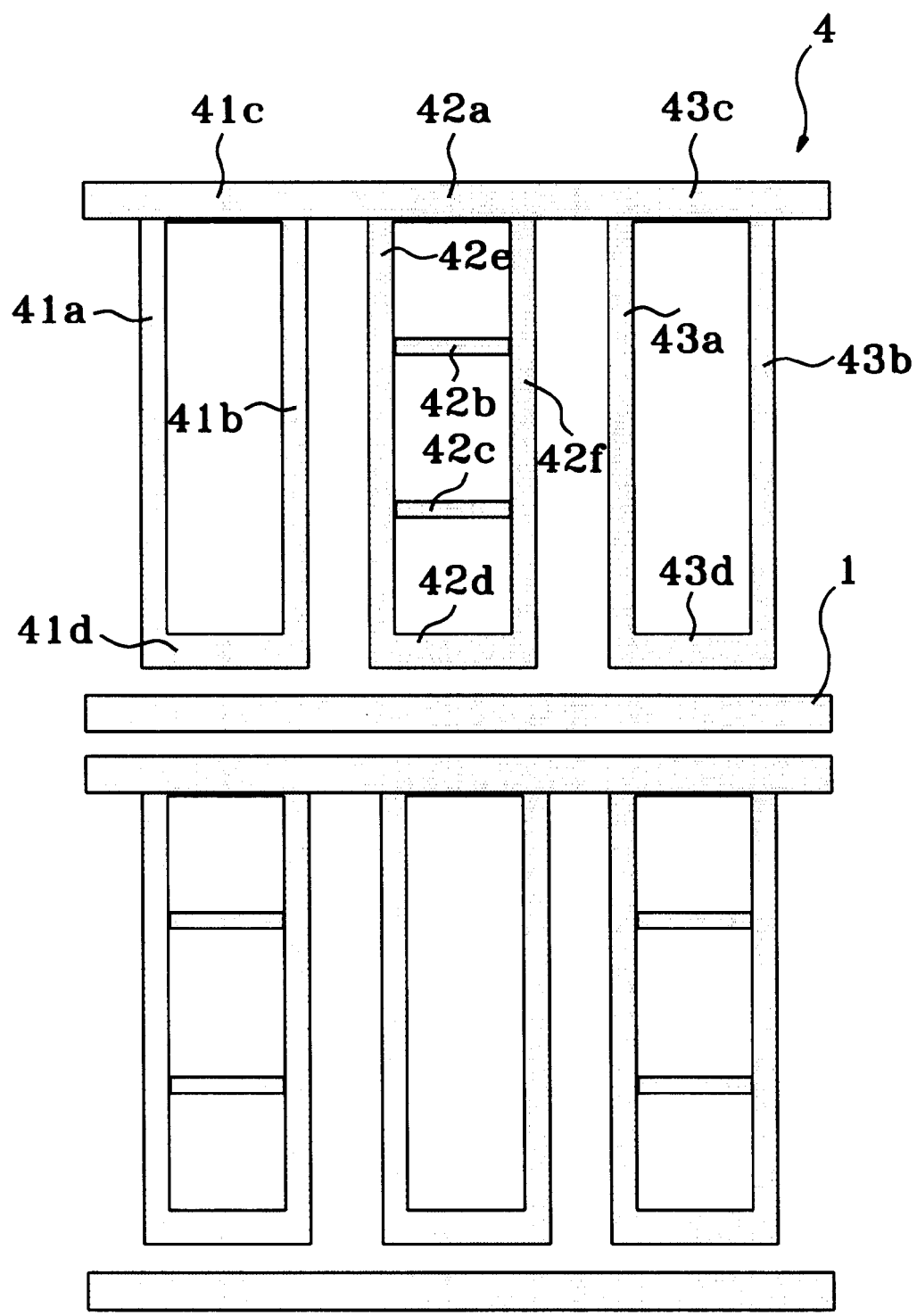
FIG. 4 illustrate a structure of a counter electrode in the first embodiment.
Figure 5:
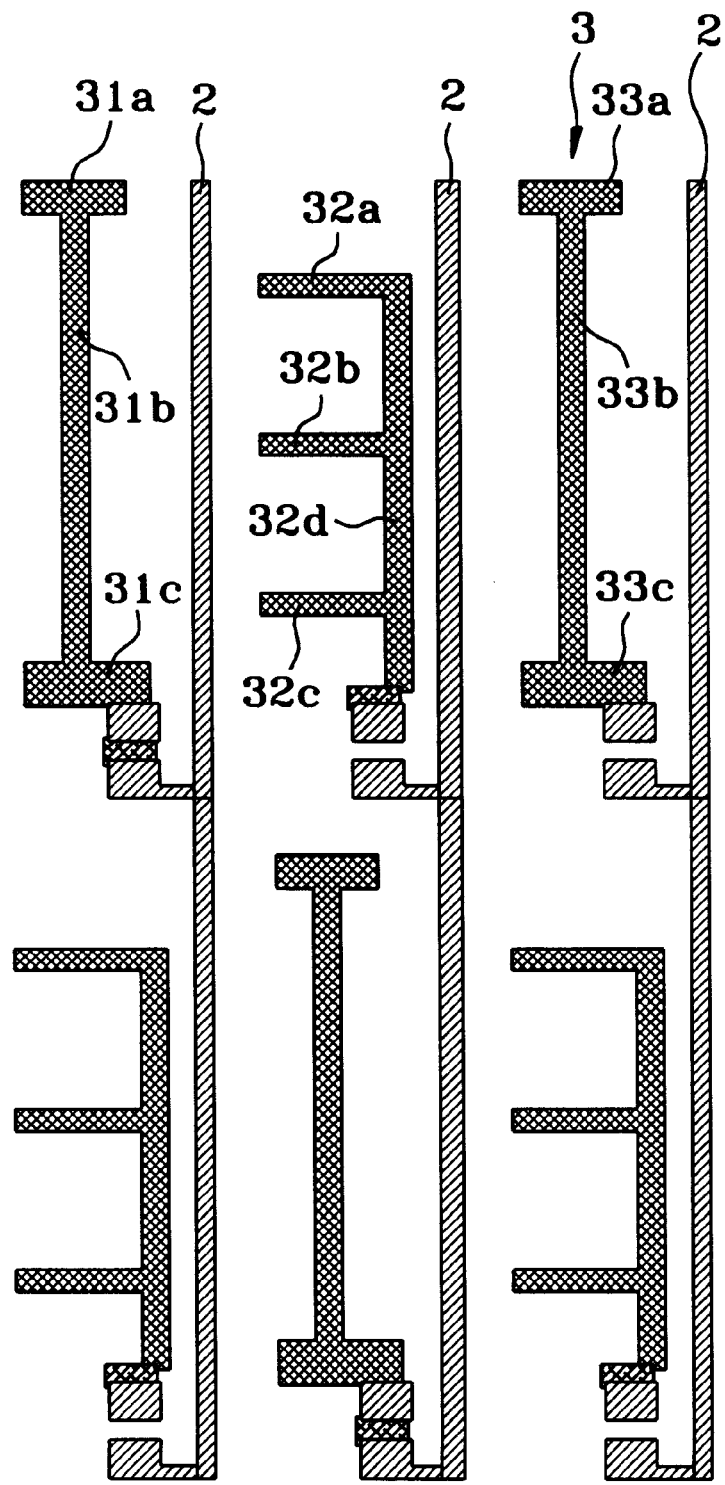
FIG. 5 illustrate a structure of a pixel electrode in the first embodiment.
Figure 6:
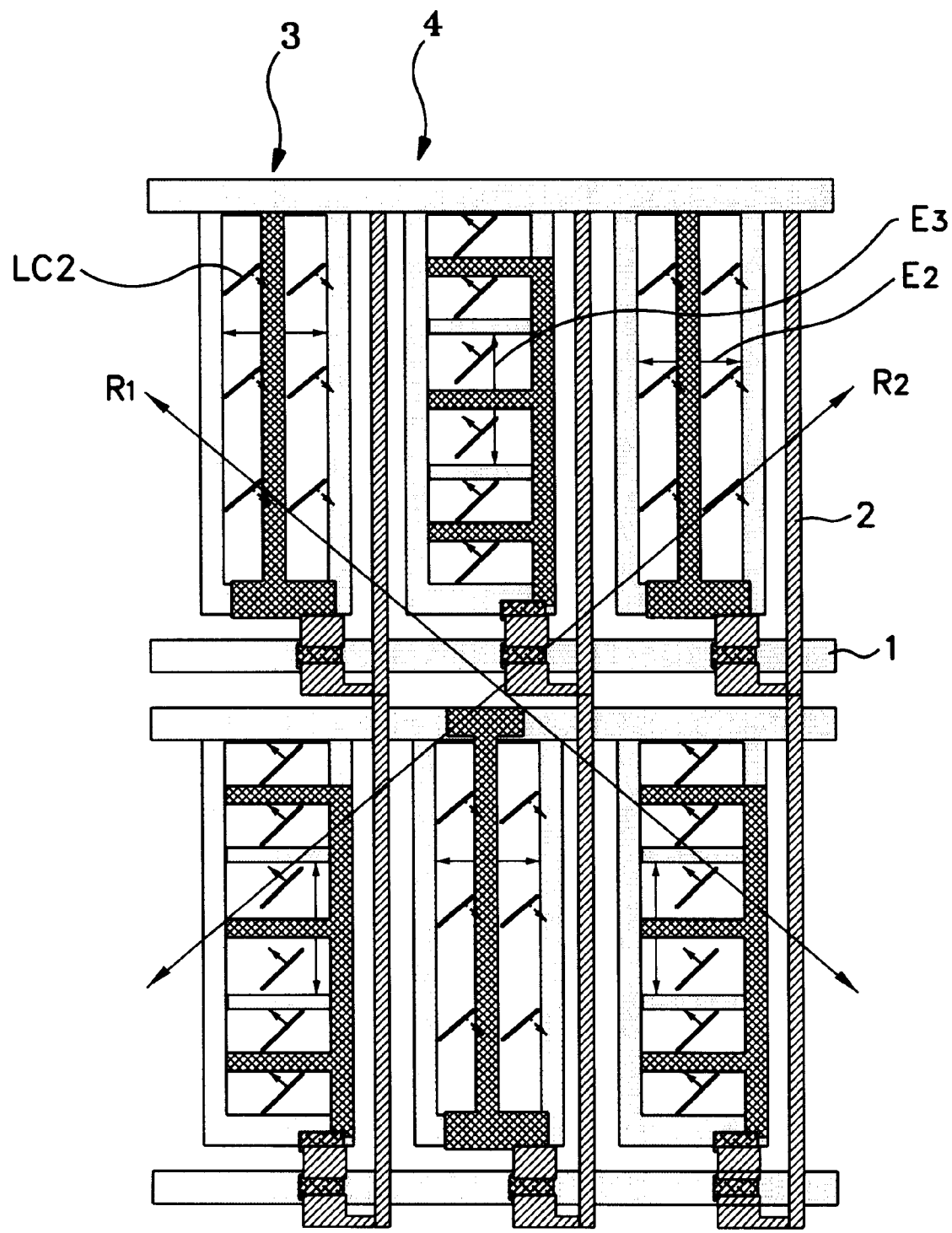
FIG. 6 is a scheme illustrating an arrangement of liquid crystal molecules when a voltage is applied to the LCD of the first embodiment.

The structure of the pixel electrode and the counter electrode in the unit pixel region and an electric field generated therebetween are shown in FIGS. 2, 4, 5 and 6. FIGS. 4, 5 and 6 illustrate only six unit pixel regions, three unit pixel regions positioned on the upper-left portion of FIG. 2 and three unit pixel regions positioned on the middle-left portion of FIG. 2. The pixel electrode and the counter electrode in all unit pixel regions are designated as the numerals 3 and 4, respectively.

First, referring to a R color region of the first unit pixel region, the counter electrode 4 includes parts 41c and 41d parallel to the data bus line 1, and parts 41a and 41b parallel to the gate bus line 2 and connected to the parts 41c and 41d. The pixel electrode 3 has parts 31a and 31c overlapped with the parts 41c and 41d of the counter electrode and parts 31b connected to the parts 31a and 31c and bisecting a space between the parts 41a and 41b of the counter electrode. The parts 31b is parallel to the gate bus line 2. At the intersection of the gate bus line 2 and the data bus line 1 is disposed a thin film transistor TFT1. On the overlapping areas 41c–31a; 41d–31c of the counter electrode and the pixel electrode are formed capacitors. Accordingly, when the voltage is applied, an electric field parallel to the data bus line 1 is formed. Here, though the R color region is bisected by the counter electrode and the pixel electrode in FIGS. 4 and 5, by controlling the number of parts of the counter electrode and the pixel electrode, the parts parallel to the gate bus line, the R color region can be divided into two regions, six regions and so forth.

Next, referring to G color region of the second unit pixel region, the counter electrode 4 has parts 42a, 42b, 42c, 42d parallel to the data bus line 1 and parts 42e and 42f parallel to the gate bus line 2. The pixel electrode 3 comprises parts 32a, 32b and 32c parallel to the data bus line, and part 32d connected to the ends of parts 32a,32b and 32c and parallel to the gate bus line 2. The part 32d is overlapped with parts 42f of the counter electrode. The G color region is divided into six areas by the counter electrode and the pixel electrode in FIGS. 4 and 5. Like the R color region, at the intersection of the gate bus line and the data bus line is disposed a thin film transistor TFT2. On the overlapping area 42f–32d of the counter electrode and the pixel electrode is formed a capacitor. Accordingly, when the voltage is applied, an electric field parallel to the gate bus line 2 is formed. Here, though the G color region is divided into six areas by the counter electrode and the pixel electrode in FIGS. 4 and 5, by controlling the number of parts of the counter electrode and the pixel electrode parallel to the data bus line, the divided areas of the G color region can be controlled.

Referring to B color region of the third unit pixel region, the counter electrode 4 includes parts 43c and 43d parallel to the data bus line 1, and parts 43a and 43b parallel to the gate bus line 2 and connected to the parts 43c and 43d. The pixel electrode 3 has parts 33a and 33c overlapped with the parts 43a and 43d of the counter electrode, and parts 33b connected to the parts 33a and 33c and bisecting a space between the parts 43a and 43b of the counter electrode. The parts 33b is parallel to the gate bus line 2. At the intersection of the gate bus line and the data bus line is disposed a thin film transistor TFT3. On the overlapping areas 43c–33a; 43d–33c of the counter electrode and the pixel electrode are formed capacitors. Accordingly, when the voltage is applied, an electric field parallel to the data bus line 1 is formed. Here, though the B color region is bisected by the counter electrode and the pixel electrode in FIGS. 4 and 5, by controlling the number of parts of the counter electrode and the pixel electrode parallel to the gate bus line, the B color region can be adjusted.

In brief, the electric field parallel to the data bus line 1 is formed in the first unit pixel region and the third unit pixel region while the electric field traverse to the data bus line, parallel to the gate bus line, is formed in the second unit pixel region. Therefore, the electric field in the one unit pixel region is substantially traverse to the electric field of unit pixel regions adjacent thereto in left, right, upper and lower directions.

As shown in FIG. 2, layout of the counter electrode and the pixel electrode of another unit pixel region adjacent to the first unit pixel region (the R color region) in the direction of the gate bus line is same to that of the second pixel region (the G color region). Therefore, the electric field of the unit pixel region located just beneath of the R color region is parallel to the data bus line 1. Similarly, the electric field of the unit pixel region located just beneath of the G color region is parallel to the gate bus line 2 and the electric field of the unit pixel region located just beneath of the B color region is parallel to the data bus line 1.

The arrangement of the liquid crystal molecules of the LCD having the counter electrode and the pixel electrode as shown in FIGS. 2, 4 and 5 will be described with reference to FIG. 6.

The liquid crystal molecules on a horizontal alignment film having a given pretilt angle, for example about 1°, are arranged along the rubbing direction when no voltage is applied. If the voltage is applied to the counter electrode and the pixel electrode, the electric field E2 parallel to the data bus line 1 is generated in the unit pixel region positioned at the upper-left portion of FIG. 6, and the liquid crystal molecules rotate from their initial state LC2 toward the right and are arranged along the electric field E2. In the unit pixel region positioned at the upper-middle portion of FIG. 6, adjacent to the unit pixel region positioned at the upper-left portion is formed an electric field E3 traverse to the data bus line 1, that is parallel to the gate bus line 2. Accordingly, the liquid crystal molecules rotate from their initial state LC2 toward the left and are arranged along the electric field E3. In the unit pixel region positioned at the upper-right portion of FIG. 6, is generated the electric field E2 which is same to that of the upper-left portion. That is, the liquid crystal molecules in the upper-right portion are arranged parallel to the gate bus line.

Since the structure of the counter electrode and the pixel electrode of the unit pixel regions positioned at the lower-left portion and lower-right portion is same to that of the unit pixel region positioned at the upper-middle portion, the liquid crystal molecules are arranged along the electric field parallel to the gate bus line 2 in the unit pixel regions positioned at the lower-left portion and lower-right portion. Also, since the structure of the counter electrode and the pixel electrode of the unit pixel regions positioned at the lower-middle portion is same to those of the unit pixel region positioned at the upper-left portion and the upper-right portion, the liquid crystal molecules are arranged along the electric field parallel to the data bus line 1 in the unit pixel regions positioned at the lower-middle portion.

As described above, an electric field generated in one unit pixel region is substantially vertical to another electric field generated in another unit pixel regions adjacent thereto in left, right, upper and lower directions. So, the liquid crystal molecules are vertically and horizontally arranged to the gate bus line in an alternative form by a unit pixel region. Therefore, it is appeared that the number of the liquid crystal molecules in all direction is same, so the index of refraction anisotropy is compensated and thus a color shift can be prevented.

For minimizing the color shift, it is preferable that the thickness of the liquid crystal layer is about 6 μm or less and the product of the thickness of the liquid crystal layer and the index of the refraction anisotropy is about 0.2 μm to about 0.6 μm.

The manufacturing method of the LCD according to the first embodiment will be described.

On the lower substrate, are formed the gate bus line and the counter electrode using a gate metal. As shown in FIG. 4, the structure of the counter electrode in one unit pixel region is different from that in adjacent unit pixel region. Thereafter, a gate insulating material is coated on the resultant and a pad is patterned. After forming an insulating layer and a semiconductor layer, an etch stopper is patterned, n+ a–Si layer is coated and an active layer is formed. Then, a source bus line and the pixel electrode are formed using a source-drain metal. As shown in FIG. 5, the structure of the pixel electrode in one unit pixel region, is different from that in adjacent unit pixel region. On the resultant is formed an insulating layer as the passivation layer and then the pad is open.

After, the alignment film having a low pretilt angle is coated and the alignment film is rubbed in a given direction. Also, another alignment film is coated on the upper substrate and rubbed in anti-parallel to the rubbing direction of the alignment film in the lower substrate. The rubbing direction of the alignment films is about +45±5° or −45±5° based on the gate bus line. Thereafter, a space for cell gap control is coated, a sealant is applied and then the lower substrate and the upper substrate are bonded, thus forming a panel having a thickness(cell gap) of about 4 μm. The liquid crystal molecules having a positive or negative dielectric anisotropy are injected to the cell gap. In general, in the light of the transmittance the liquid crystal molecules having negative dielectric anisotropy is preferred. However, the LCD using the liquid crystal molecules having negative dielectric anisotropy can not secure a reliability. On the other hand, since the liquid crystal molecules having positive dielectric anisotropy can reduce a driving voltage of the LCD, in view of the driving voltage the liquid crystal molecules having positive dielectric anisotropy is recommended. Thereafter, on a rear surface of the lower substrate is attached a polarization film having a polarization axis R1 consistent with the rubbing direction. Also, on a rear surface of the upper substrate is attached another polarization film having a polarization axis R2 forming 90° with respect to the polarization axis of the polarization film in the lower substrate.

EXAMPLE 2

Figure 3:
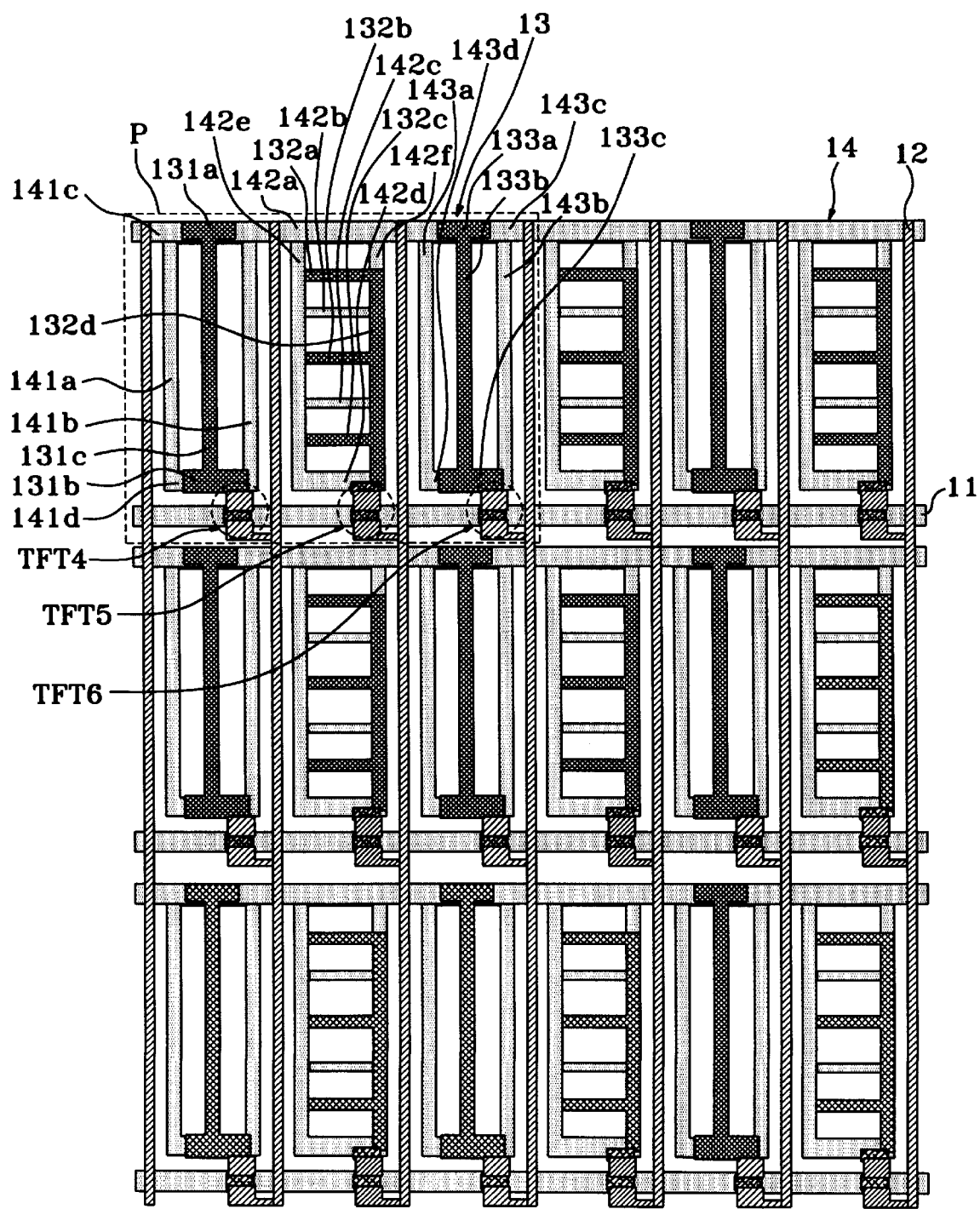
FIG. 3 is a scheme illustrating a structure of electrodes of the second embodiment in accordance with the present IPS mode LCD.

FIG. 3 shows a pixel layout of the LCD according to the second embodiment of the present invention in which a direction of an electric field and an arrangement of liquid crystal molecules are same to those of the first embodiment and a pixel electrode and a counter electrode correspond to the counter electrode and the pixel electrode of the first embodiment, respectively. That is, numerals 11, 12, 14, 13 and TFT4 to TFT6 in FIG. 3 correspond to the numerals 1, 2, 3,4 and TFT1 to TFT3 of FIG. 2, respectively. Also, numerals 141*a* to 141*d*,142*a* to 142*f* and 143*a* to 143*d* represent the pixel electrode in the unit pixel region and the numerals 131*a* to 131*d*,132*a* to 132*d* and 133*a* to 133*c* represent the counter electrode in unit pixel region.

As described above, the pixel electrode and the counter electrode are devised so that an electric field in one unit pixel region is substantially tranverse to an electric field in another unit pixel regions adjacent to the one unit pixel region in left, right, upper and lower directions. Accordingly, the color shift of the LCD can be prevented.

What is claimed is:

1. A liquid crystal display(LCD) comprising:
   a lower substrate,
   a plurality of gate bus lines and a plurality of data bus lines disposed in a matrix form on the lower substrate, for defining a plurality of unit pixel regions;
   a plurality of first electrodes each formed on each unit pixel region; and
   a plurality of second electrodes corresponding to the first electrodes, each of the second electrodes formed on each unit pixel region; and
   wherein a direction of an electric field generated between the first electrode and the second electrode in one unit pixel region among the plurality of unit pixel regions is substantially traverse to a direction of an electric field generated between the first electrode and the second electrode in another unit pixel regions adjacent to the one unit pixel region.

2. The LCD as claimed in claim 1, wherein the unit pixel region comprises a first sub unit pixel region, a second sub unit pixel region and a third sub unit pixel region.

3. The LCD as claimed in claim 2, wherein the first sub unit pixel region, the second sub unit pixel region and the third sub unit pixel region are a red color region, a green color region and a blue color region, respectively.

4. The LCD as claimed in claim 3, wherein a direction of an electric field generated between the first electrode and the second electrode in one sub unit pixel region among the three sub unit pixel regions is substantially traverse to a direction of an electric field generated between the first electrode and the second electrode in another sub unit pixel region adjacent to the one sub unit pixel region.

5. The LCD as claimed in claim 4, wherein the first electrode is a pixel electrode and the second electrode is a counter electrode.

6. The LCD as claimed in claim 4, further comprising an alignment film formed on the lower substrate having the pixel electrode and the counter electrode and wherein a rubbing direction of the alignment film is about +45±5° or −45±5° based on the gate bus line.

7. The LCD as claimed in claim 4, further comprising a upper substrate spaced from and opposite to the lower substrate and a liquid crystal layer formed between the lower substrate and a upper substrate and wherein a thickness of the liquid crystal layer is about 6 μm or less.

8. The LCD as claimed in claim 7, wherein a dielectric anisotropy of a liquid crystal molecule in the liquid crystal layer is positive or negative.

9. The LCD as claimed in claim 7, wherein a product of the thickness of the liquid crystal layer and an index of refraction anisotropy is about 0.2 μm to about 0.6 μm.

10. The LCD as claimed in claim 3, wherein the first electrode is a pixel electrode and the second electrode is a counter electrode.

11. The LCD as claimed in claim 2, wherein a direction of an electric field generated between the first electrode and the second electrode in one sub unit pixel region among the three sub unit pixel regions is substantially traverse to a direction of an electric field generated between the first electrode and the second electrode in another sub unit pixel region adjacent to the one sub unit pixel region.

12. The LCD as claimed in claim 11, wherein the first electrode is a pixel electrode and the second electrode is a counter electrode.

13. The LCD as claimed in claim 11, wherein the first electrode and the second electrode in each sub unit pixel region is disposed so that the each sub unit pixel region has at least two domains in which an arrangement of a liquid crystal molecule is symmetrical.

14. The LCD as claimed in claim 2, wherein the first electrode is a pixel electrode and the second electrode is a counter electrode.

15. The LCD as claimed in claim 2, wherein the first electrode and the second electrode in each sub unit pixel region is disposed so that the each sub unit pixel region has at least two domains in which an arrangement of a liquid crystal molecule is symmetrical.

16. The LCD as claimed in claim 1, wherein the first electrode is a pixel electrode and the second electrode is a counter electrode.

17. The LCD as claimed in claim 1, further comprising an alignment film formed on the lower substrate having the pixel electrode and the counter electrode and wherein a rubbing direction of the alignment film is about +45±5° or −45±5° based on the gate bus line.

18. The LCD as claimed in claim 1, further comprising a upper substrate spaced from and opposite to the lower substrate and a liquid crystal layer formed between the lower substrate and a upper substrate and wherein a thickness of the liquid crystal layer is about 6 $\mu$m or less.

19. The LCD as claimed in claim 18, wherein a dielectric anisotropy of a liquid crystal molecule in the liquid crystal layer is positive or negative.

20. The LCD as claimed in claim 18, wherein a product of the thickness of the liquid crystal layer and an index of refraction anisotropy is about 0.2 $\mu$m to about 0.6 $\mu$m.

* * * * *